Figure 1:
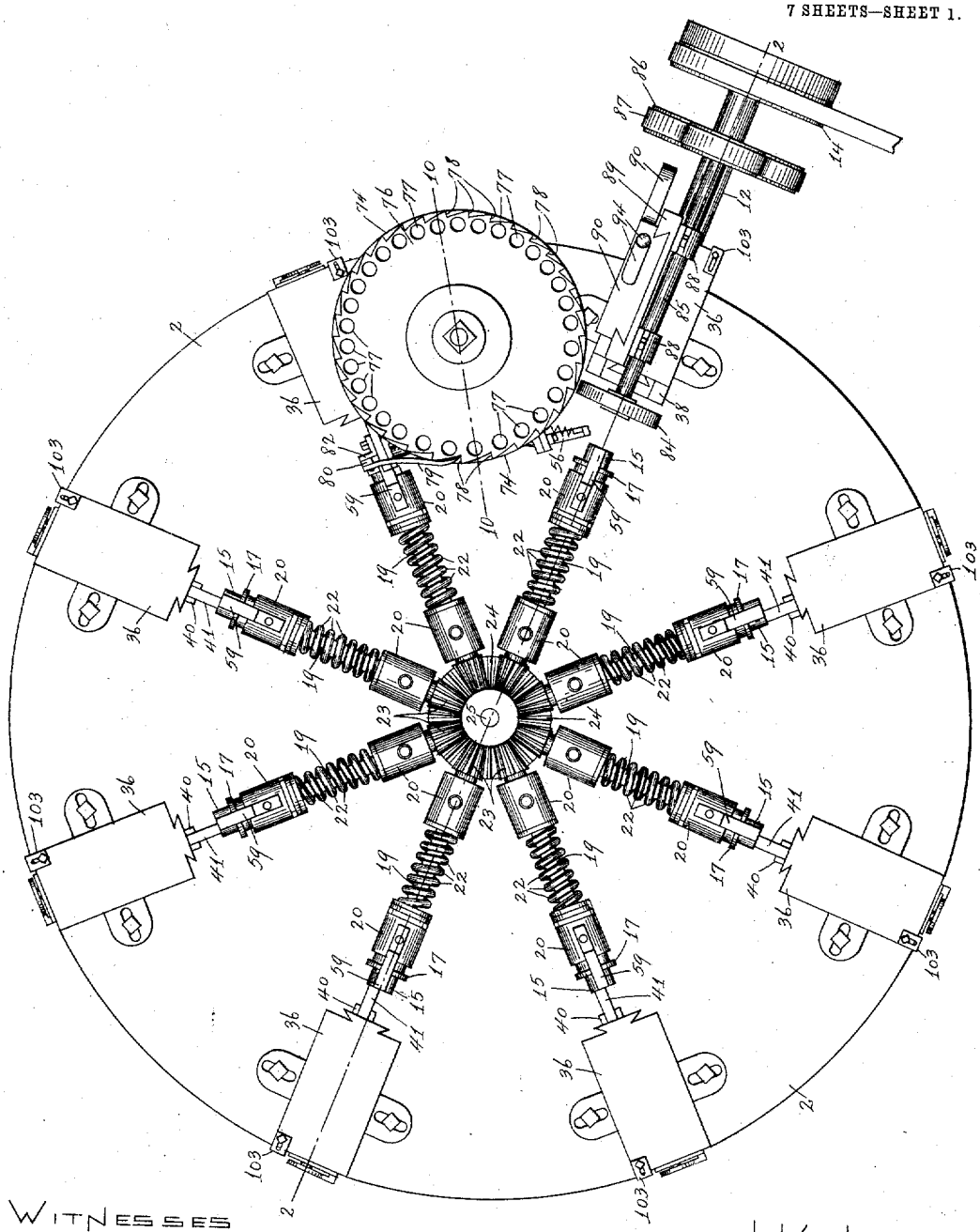

No. 12,400.

REISSUED NOV. 7, 1905.

H. CHALMERS.

BUTTON WORKING MACHINE.

APPLICATION FILED FEB. 8, 1905.

7 SHEETS—SHEET 1.

WITNESSES

S. C. Booth

E. M. O'Reilly

INVENTOR

Harry Chalmers

By Mosher & Curtis

Attys.

ANDREW B. GRAHAM CO., PHOTO-LITHOGRAPHERS, WASHINGTON, D. C.

No. 12,400. REISSUED NOV. 7, 1905.

H. CHALMERS.

BUTTON WORKING MACHINE.

APPLICATION FILED FEB. 8, 1905.

7 SHEETS—SHEET 2.

WITNESSES

S. C. Booth

E. M. O'Kelly.

INVENTOR

Harry Chalmers

By Mosher & Curtis

Attys.

No. 12,400.

REISSUED NOV. 7, 1905.

H. CHALMERS.

BUTTON WORKING MACHINE.

APPLICATION FILED FEB. 8, 1905.

7 SHEETS—SHEET 3.

WITNESSES
J. C. Bond
E. M. O'Reilly

INVENTOR
Harry Chalmers
By
Mosher & Curtis
Attys.

No. 12,400. REISSUED NOV. 7, 1905.

H. CHALMERS.

BUTTON WORKING MACHINE.

APPLICATION FILED FEB. 8, 1905.

7 SHEETS—SHEET 4.

WITNESSES

S. C. Booth.

E. M. O'Reilly.

INVENTOR

Harry Chalmers

By Mosher & Curtis

Attys.

No. 12,400. REISSUED NOV. 7, 1905.
H. CHALMERS.
BUTTON WORKING MACHINE.
APPLICATION FILED FEB. 8, 1905.
7 SHEETS—SHEET 5.
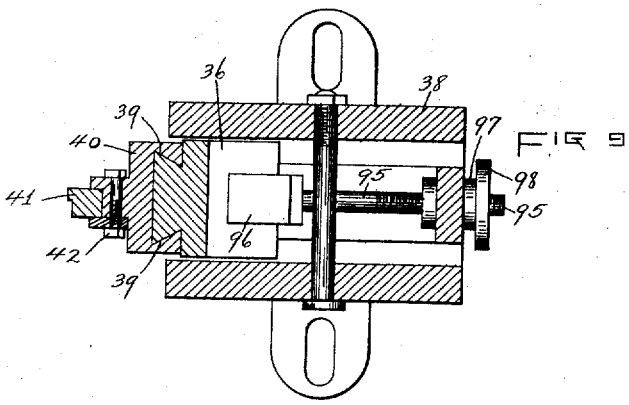
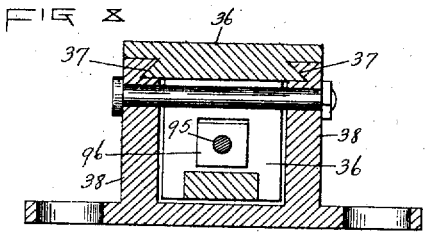
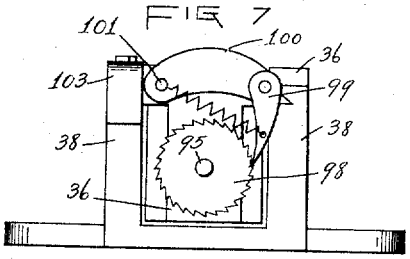
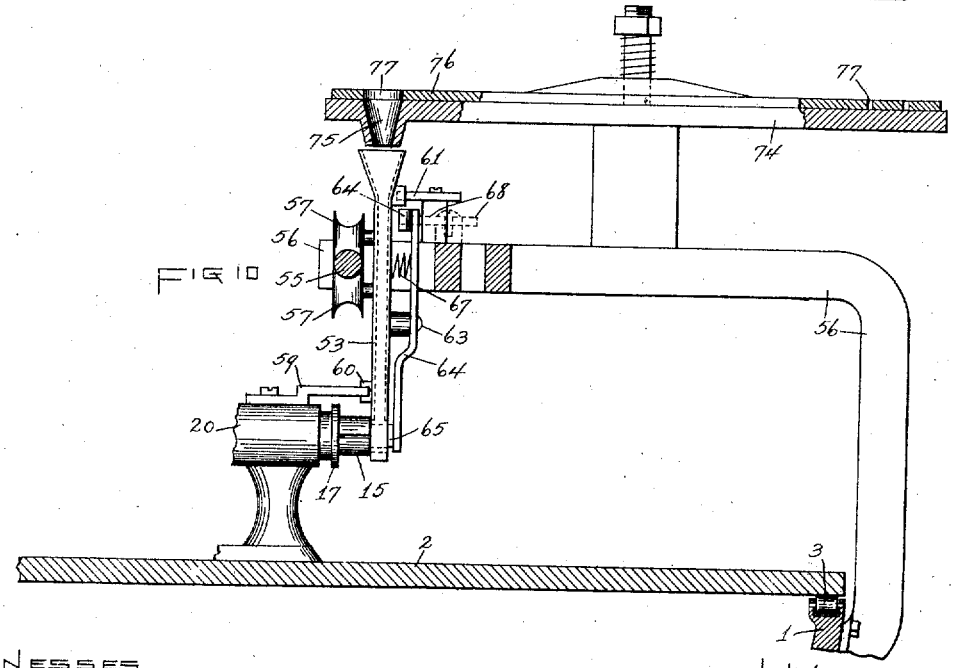
WITNESSES
J. C. Bach.
E. M. O'Reilly.
INVENTOR
Harry Chalmers
by Mosher & Curtis
attys.

No. 12,400. REISSUED NOV. 7, 1905.

H. CHALMERS.

BUTTON WORKING MACHINE.

APPLICATION FILED FEB. 8, 1905.

7 SHEETS—SHEET 6.

WITNESSES
S. C. Booth
E. M. O'Reilly

INVENTOR
Harry Chalmers
By Mosher & Curtis
Attys.

No. 12,400. REISSUED NOV. 7, 1905.

H. CHALMERS.

BUTTON WORKING MACHINE.

APPLICATION FILED FEB. 8, 1905.

7 SHEETS—SHEET 7.

WITNESSES

S. E. Brett

E. M. O'Reilly.

INVENTOR

Harry Chalmers

By Mosher & Curtis

Attys

UNITED STATES PATENT OFFICE.

HARVEY CHALMERS, OF AMSTERDAM, NEW YORK, ASSIGNOR TO HARVEY CHALMERS & SON, OF AMSTERDAM, NEW YORK, A FIRM.

BUTTON-WORKING MACHINE.

No. 12,400. Specification of Reissued Letters Patent. Reissued Nov. 7, 1905.

Original No. 740,231, dated September 29, 1903. Application for reissue filed February 8, 1905. Serial No. 245,159.

*To all whom it may concern:*

Be it known that I, HARVEY CHALMERS, a citizen of the United States, residing at Amsterdam, county of Montgomery, and State of New York, have invented certain new and useful Improvements in Button-Working Machines, of which the following is a specification.

The invention relates to such improvements; and it consists of the novel construction and combination of parts hereinafter described and subsequently claimed.

Reference may be had to the accompanying drawings, and the reference characters marked thereon, which form a part of this specification.

Similar characters refer to similar parts in the several figures.

Figure 2:
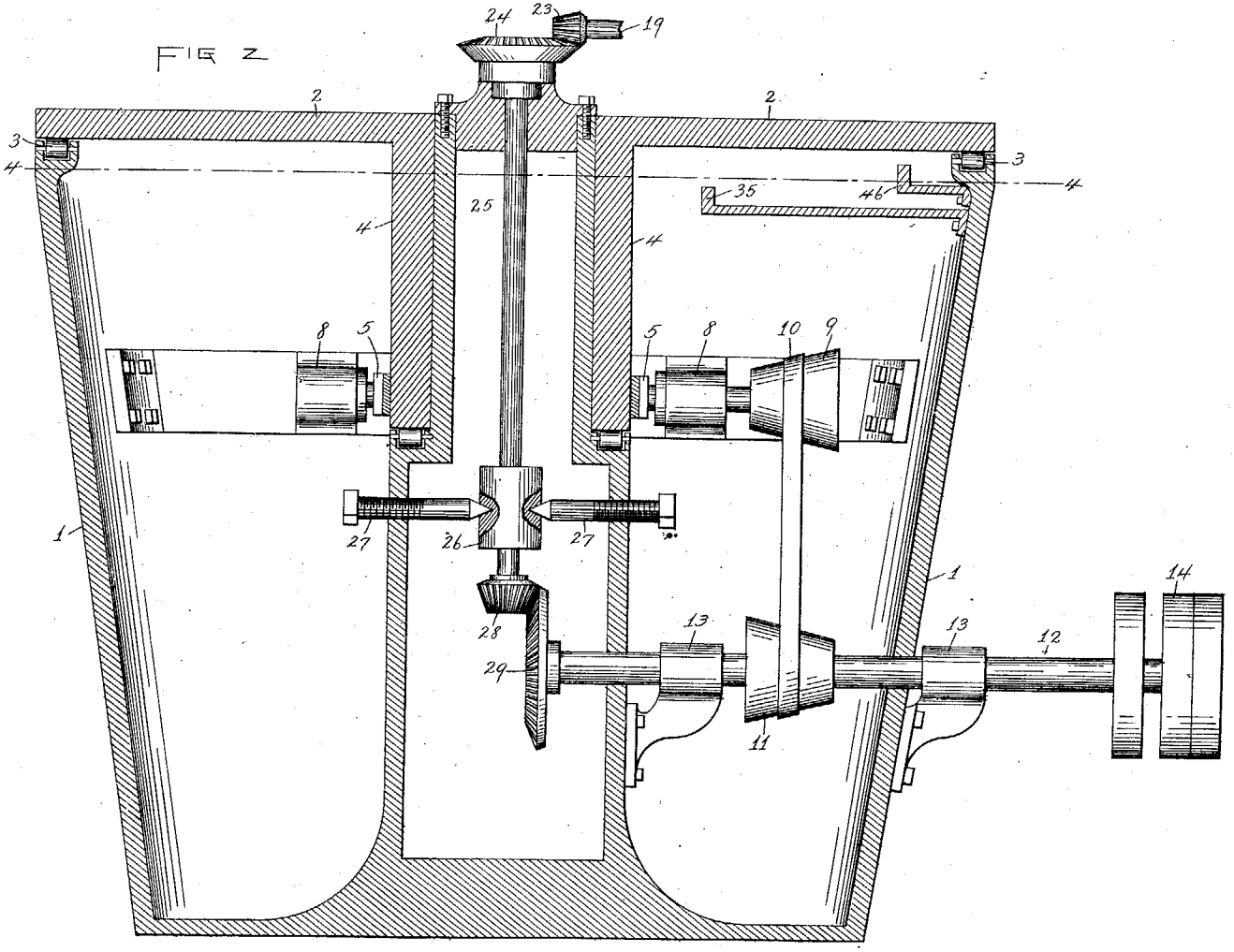
Figure 3:
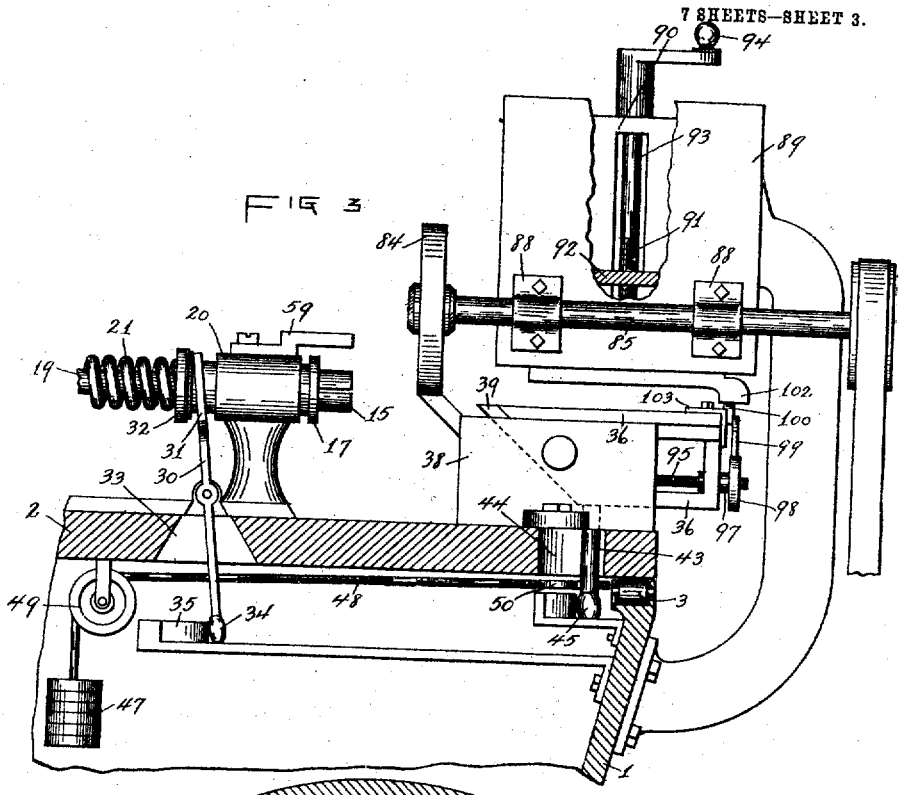
Figure 4:
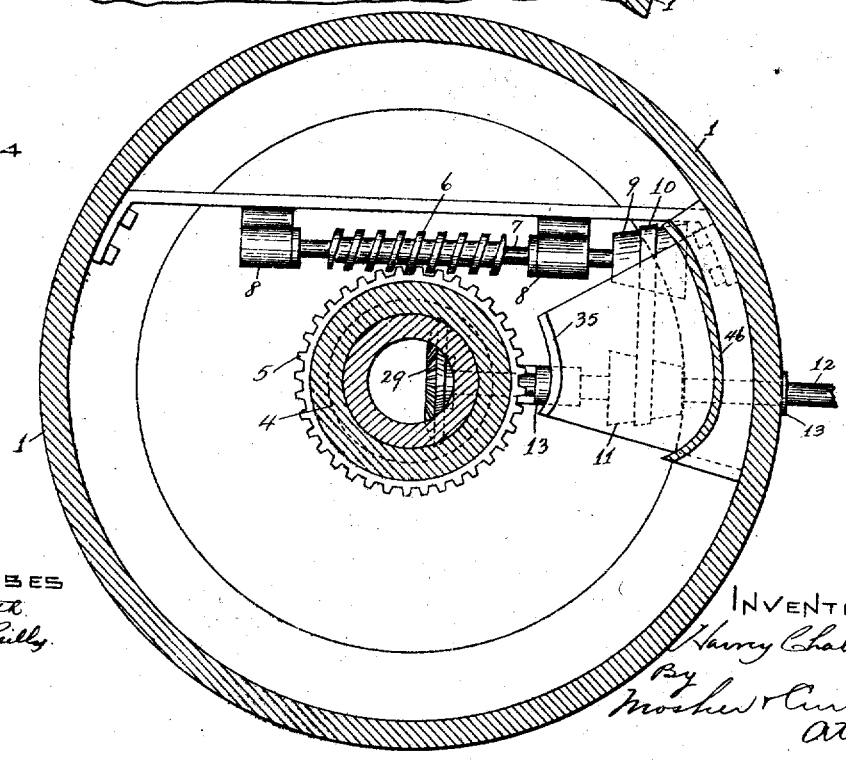
Figure 5:
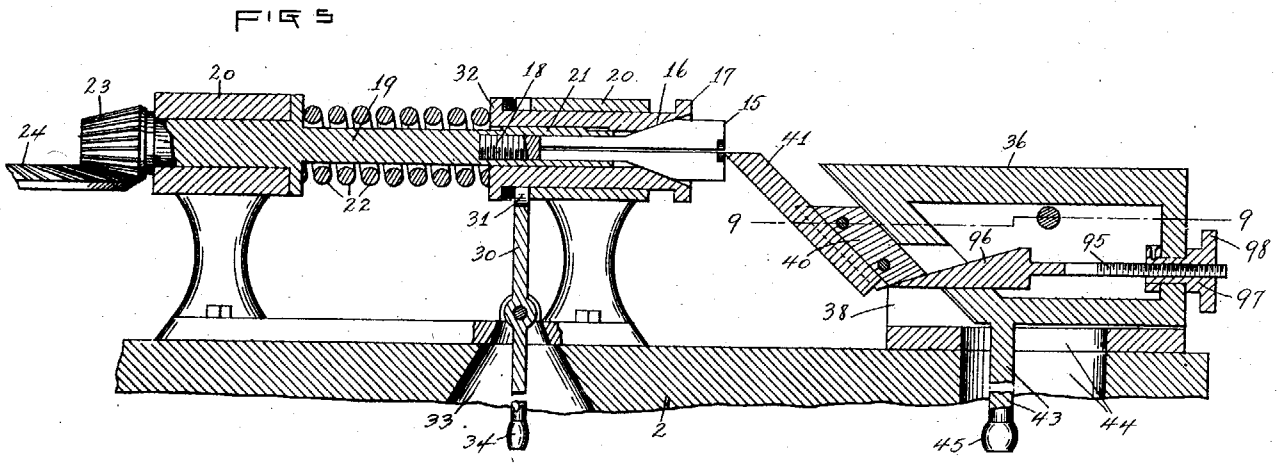
Figure 6:
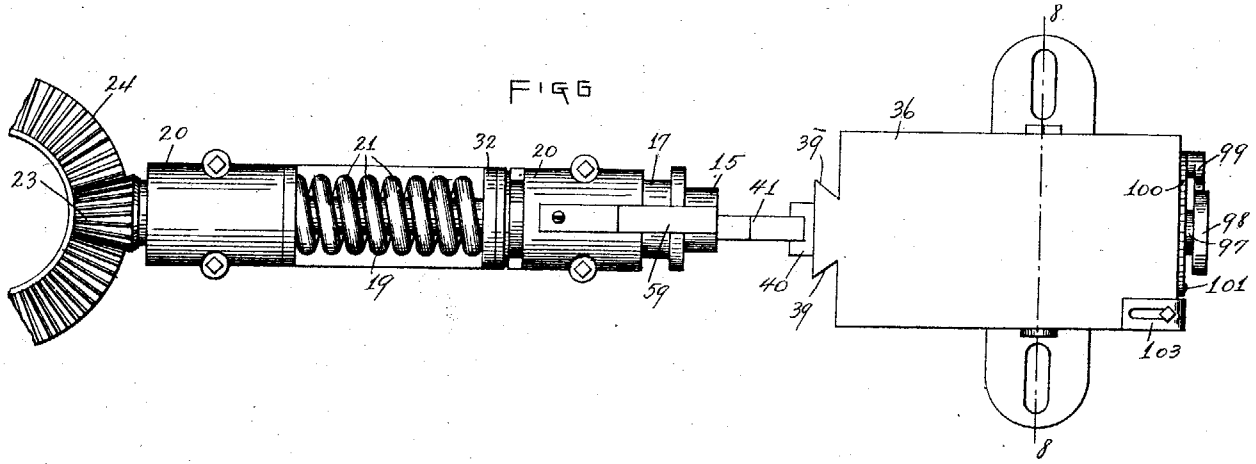
Figure 11:
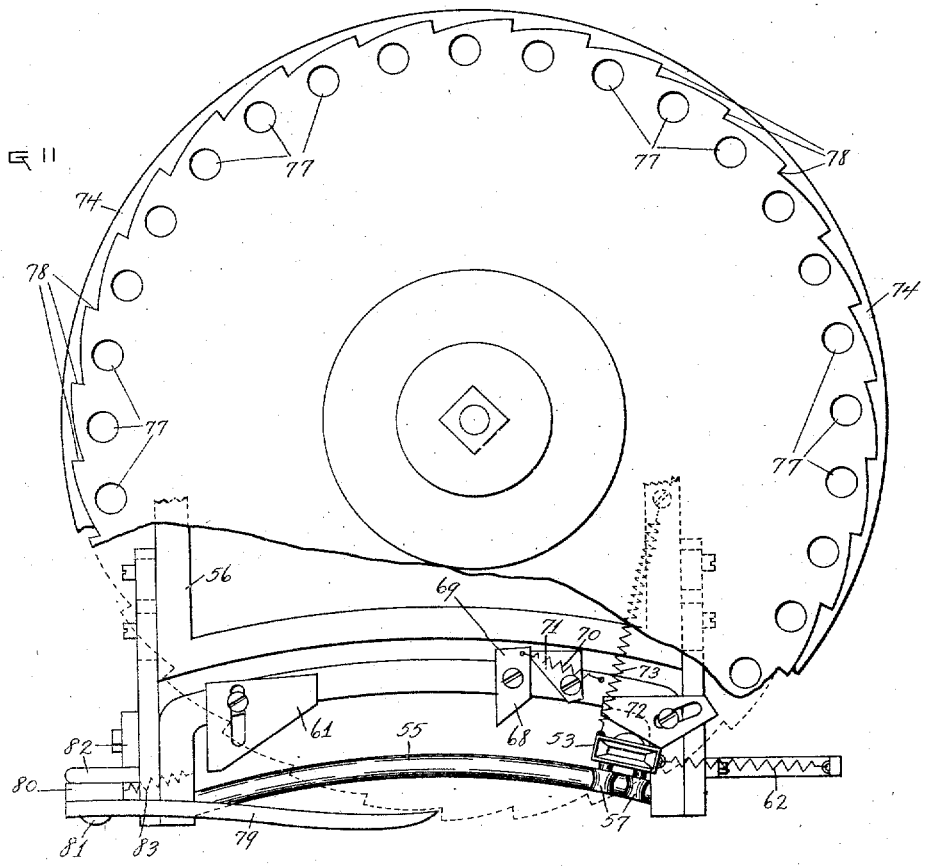
Figure 12:
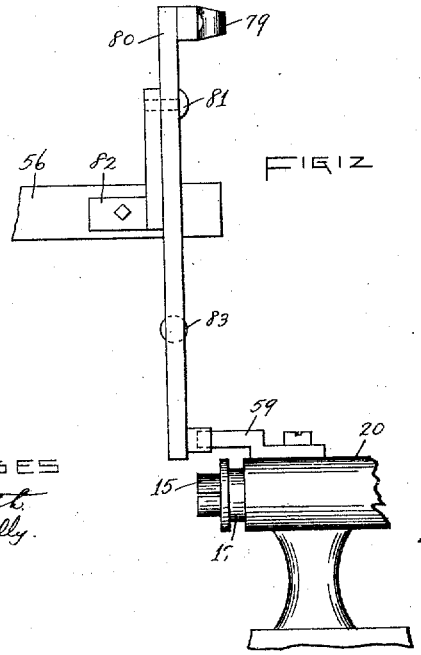
Figure 14:
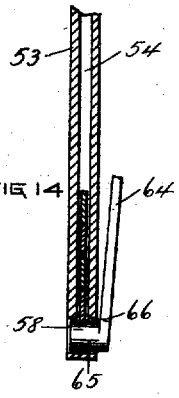
Figure 15:
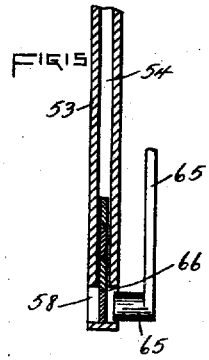
Figure 13:
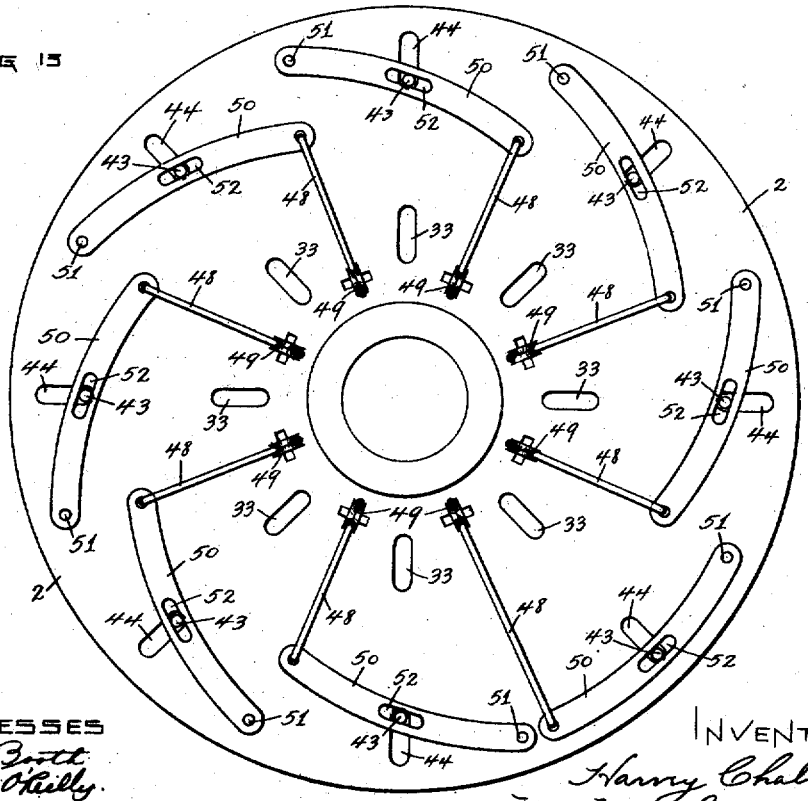

Figure 1 of the drawings is a top plan view of my improved button-working machine. Fig. 2 is a central vertical section of the same, taken on the broken line 2 2 in Fig. 1, with the table-supported mechanism omitted. Fig. 3 is a similar sectional view, on an enlarged scale, showing the table-supported mechanism, the plane of the section being just in rear of the grinding mechanism. Fig. 4 is a cross-section taken on the broken line 4 4 in Fig. 2. Fig. 5 is a central vertical longitudinal section of a chuck and its coöperating tool mechanism. Fig. 6 is a top plan view of the same. Fig. 7 is a view in elevation of the outer side of the tool-supporting mechanism. Fig. 8 is a vertical cross-section of the same, taken on the broken line 8 8 in Fig. 6. Fig. 9 is a horizontal section of the same, taken on the broken line 9 9 in Fig. 5. Fig. 10 is a view, partly in elevation and partly in section, taken on the broken line 10 10 in Fig. 1 of the feed mechanism. Fig. 11 is a top plan view, on an enlarged scale, of the feed mechanism, the feed-table being partly broken away. Fig. 12 is a view in side elevation of the lever and ratchet mechanism for imparting to the feed-disk a step-by-step movement. Fig. 13 is a bottom plan view of the feed-table and the mechanism supported thereby. Fig. 14 is a vertical cross-section of the lower end of the work-carrier, showing the ejecting-plunger in side elevation projected therethrough. Fig. 15 is a similar view with the plunger withdrawn.

The object of my invention is to facilitate the manufacture of small articles, such as buttons and the like, in the manufacture of which it is necessary to subject each article while held in a chuck to the action of a tool in giving shape to or otherwise treating the article.

My invention is adapted for various styles of machines adapted to perform different operations upon the work, as well as for machines for operating upon different kinds of work.

I have shown in the drawings and will proceed to describe the invention in its application to a machine for turning button-disks, as in the manufacture of shell buttons.

Referring to the drawings, 1 is the stationary frame of the machine, upon which is rotatively mounted the circular table 2, supported upon the roller-bearings 3. The table is provided with a hub 4, having fixed thereon a worm-gear 5 in engagement with a worm 6 on the worm-shaft 7, rotatively supported in bearings 8 on the stationary frame of the machine and provided with a belt-pulley 9, connected by belt 10 with a similar belt-pulley 11 on the drive-shaft 12, rotatively supported in bearings 13 on the stationary frame of the machine and provided with a drive-pulley 14, whereby continuous rotary movements may be imparted to said table. A plurality of chucks 15, each adapted to hold a button-disk, are disposed symmetrically upon said table with their axes arranged radially thereof and are adapted to be carried in a circular path by the table as the same is rotated. Each of these chucks comprises a split-jaw member having a conical exterior surface at 16, adapted to engage a similar conical surface on the interior of the sleeve 17 at its outer end. The chuck is secured, by means of a threaded shank 18, to the outer end of the spindle 19, rotatively mounted in the bearings 20, erected from said table and provided with shoulders whereby said spindle is supported against longitudinal movement. The outer end of this spindle projects within the sleeve 17 and is connected to rotate therewith by means of the spline or feather 21. The chuck sleeve and spindle are thus connected to rotate in unison, while the sleeve is permitted a sliding movement relatively to the chuck and spindle sufficient to at certain times securely clamp the chuck-jaws upon a button-disk inserted between them and at certain other times to permit said jaws to separate by reason of their resiliency to release the disk. A coil-spring 22, inclosing said spindle, serves to yieldingly retain the chuck-controlling sleeve 17 in its outermost position, in which it is adapted to clamp the chuck-jaws upon the inserted button-disk.

The chuck-spindles 19 are arranged radially of the table 2, and each spindle is provided on its inner end with a beveled pinion 23, said pinions on the several spindles being all adapted to mesh with a common beveled gear 24, fixed upon the vertical shaft 25, extending axially through the hub of the table and rotatively mounted in bearings on the stationary frame of the machine. The bearing for the lower end of this shaft is in the form of a sleeve 26, supported by two screw-bolts 27, having conical ends fitting in conical recesses in opposite sides of the sleeve. This vertical shaft is provided on its lower end with a beveled pinion 28, adapted to engage a bevel-gear 29 on the main drive-shaft 12, whereby continuous rotary movements at a high rate of speed are imparted to the several chuck-spindles and chucks.

As a means for sliding the sleeve 17 inwardly to relieve the chuck from the clamping pressure and permit the same to expand and relieve the clamped button-disk I provide for each chuck a lever 30, fulcrumed intermediately of its ends upon the table and provided at its upper end with a yoke 31, embracing the sleeve 17 forwardly of the end flange 32 thereof, and having its lower end projected downwardly through an aperture 33 in the table and provided with a cam-follower 34, adapted to engage at each rotation of the table a cam 35, fixed upon the stationary frame of the machine. Each chuck is thus operated automatically to release a clamped button-disk and to permit the insertion of a new button-disk at each rotation of the table. In line with each of these chucks is located a tool-carriage 36, slidable toward and from the chuck along dovetailed slideways 37 on the member 38, fixed upon the table. This tool-carriage is provided on its inner end with a dovetailed slideway 39, extending obliquely upwardly and inwardly at an angle of forty-five degrees and adapted to receive and fit the tool-holder 40, carrying the tool 41, clamped therein by means of the bolt and nut 42.

I provide means for moving each tool-carriage along its slideway toward and from its chuck at a certain time during each rotary movement of the table. The means shown for this purpose comprises an arm 43, depending from the tool-carriage through a slot 44 in the table and member 38 and provided on its lower end with a cam-follower 45, adapted at each rotation of the table to engage a cam 46, fixed upon the stationary frame of the machine, whereby a slide movement of the carriage away from its chuck is caused at each rotation of the table and a weight 47, connected by cord 48, passing over pulley 49, with lever 50, fulcrumed at 51 upon the under side of the table and having a slotted connection at 52 with said arm 43, whereby the tool-carriage is moved toward its chuck when released from the control of the cam 46 and yieldingly held at the limit of its inner slide movement until the completion of a rotary movement of the table again brings the cam-follower 45 into engagement with said cam. The tool mounted upon the carriage is thus maintained in engagement with its work, held by the chuck throughout a complete rotation of the table except for the interval during which the tool-carriage is under the control of the cam 46. The cams 35 and 46 are so arranged that the tool-carriage is moved away from the chuck at the time the chuck is opened to release a clamped button-disk and receive a new disk. Disks may be released from and supplied to the several chucks in any known manner.

I have shown means for automatically supplying to each chuck in the interval during which it is under the control of the cam 35 at each rotation of the table a new button-disk. Such means comprises feeding mechanism consisting in part of the work-carrier 53, having a vertical slideway or chute 54, to which the button-disks may be supplied in any known manner. This carrier is mounted to travel back and forth upon a track 55, supported in fixed position by means of brackets 56, erected from the stationary frame of the machine, said track extending concentrically with the table 2. This track is preferably in the form of a cylindrical rod bent to the desired curvature, and the carrier is mounted thereupon by means of four concaved rollers 57, as shown in the drawings. The lower end of the carrier is thus supported in close proximity to the path traversed by the chucks as they accompany the table in its rotary movements, and on the side facing the chucks the carrier is provided with a lateral aperture 58, extending outwardly from the bottom of the chute or slideway 54 and adapted to permit passage therethrough of the lowermost button-disk in the chute. The members are so arranged and the movements so timed that the aperture 58 is brought opposite the open jaws of each chuck at each rotation of the table and in the interval during which the chuck and tool-carriage are under the control of their respective operating-cams, and I provide means at such time for moving the work-carrier for a short distance in unison with the opened chuck and while so moving in unison for transferring the button-disk from the carrier to the chuck.

Adjacent to each chuck I provide an offsetting arm 59, adapted at each rotation of the table to engage a lug 60, projecting from the face of the work-carrier, and thereby cause said carrier to accompany the table in its rotary movements until the engagement of said arm and lug is discontinued.

The manner in which the carrier is mounted or hung upon the track-rod 55 permits a rocking movement of the carrier upon said rod as well as its traveling movement thereupon.

The carriage normally is supported in position for the lug 60 to be engaged by the arm 59 on the table; but as the carriage approaches the end of the movement which it is desired it should have in unison with the table the upper end of the carrier is brought into engagement with a fixed cam 61, thereby imparting to the carrier a rocking movement sufficient to withdraw the lug 60 from the path of the arm 59, whereupon a return movement is imparted to the carrier along its track by means of the coil-spring 62. Each passage of the chuck past the carrier thus induces a reciprocating movement of the carrier along its track.

Upon the outer side of the carrier is fulcrumed at 63 a lever 64, provided on its lower end with a plunger 65, capable of reciprocating movements through an aperture 66 in the outer wall of the chute through the lower end of the chute and through the aperture 58 in the inner wall of the chute, said apertures being in line with each other. A spring 67 yieldingly holds this lever in such a position that said plunger occupies the lower portion of the chute, preventing the button-disks from descending to the extreme bottom thereof or into line with the exit-aperture.

The upper end of the lever 64 is adapted to be carried by the movement of the work-carrier moving in unison with the table into engagement with the cam 68, mounted upon a fixed support, whereby said lever is first operated to withdraw the plunger 65 from the lower end of the chute, permitting the lowermost button to descend by gravity to a point opposite the exit-aperture, and then as said lever is moved fully past said cam and released therefrom its coil-spring 67 imparts a reverse movement to the lever, which causes the plunger to be forcibly projected against the lowermost button-disk, driving the same before it through the exit-aperture 58 into the open chuck. The cam 68 is formed upon the end of the lever 69, whereby the cam is mounted upon the fixed support, which lever is yieldingly held by a spring 70 against a fixed stop 71, which supports the cam in resistance to the lever 64 when the carrier is moved in unison with the table and permits the same to yield when engaged by the lever in its return movement. When the carrier is retracted by the spring 62, it is forced against the adjustable cam 72, which serves to rock the carrier sufficiently to bring its lower end out of the path of the chucks, but leaving the lug 60 in the path of the arm 59. As soon as the carrier is forced by engagement with the arm 59 away from the cam 72 its lower end is forced by the action of the coil-spring 73 into actual contact with the chuck-jaws, thereby facilitating the transfer of the button-disk from the carrier to the chuck in the manner above described.

As a means for supplying button-disks to the carrier I provide a stationary table or bed 74, supported by the bracket 56, above and overhanging the work-carrier and provided with an aperture 75, located directly above the flaring upper end of the feed-chute or the carrier when the same is retracted by the spring 62 and accurately positioned by engagement with the cam 72. The aperture 75 is adapted to permit the passage down therethrough of a button-disk. Rotatively mounted upon this stationary bed is a circular disk 76, provided with a plurality of apertures 77, each adapted to receive a button-disk, said apertures being arranged in a circular row around the outer edge of the disk and equidistant from the center of the disk with each other and with the aperture 75 in the bed 74. Button-disks placed in said disk-apertures will by a rotary movement of the disk be successively moved along the bed until brought into line with the bed-aperture 75 and permitted to fall by gravity therethrough.

The feed-disk 76 is provided with a ratchet edge 78, the teeth of which are engaged by the pawl 79, connected with the upper end of lever 80, fulcrumed at 81 upon a fixed bracket 82 and having its lower end yieldingly held by the coil-spring 83 in the path of the several arms 59, carried by the rotary table 2 and adapted to be engaged by each of said arms at each rotation of said table to induce a step-by-step rotative movement of the feed-disk, the arrangement being such that the feed-disk is thus operated while the carrier is in its retracted position directly beneath the feed-bed aperture 75. It is therefore only necessary that an attendant should from time to time supply the apertures in the feed-disk with button disks or blanks.

In working upon shell buttons the tools employed require frequent sharpening, and I have shown means for subjecting each tool to the action of sharpening mechanism during each interval when the tool is removed from the work. The sharpening mechanism may be of any known form. For this purpose I provide an emery-wheel 84, fixed upon the shaft 85, provided with the belt-pulley 86, adapted to receive the driving-belt 87, whereby rapid rotary movements may be imparted to the wheel. The wheel-shaft 85 is supported in bearings 88 on the slide-block 89, having a dovetailed sliding connection with the fixed bracket 90, permitting a vertical adjustment of said shaft and wheel, which adjustment can be accomplished by means of the screw 91, fitting a screw-threaded aperture in the flange 92, fixed on the slide-block 89, said screw having a bearing at 93 in the fixed bracket 90 and being provided with a crank-handle 94. The position of the emery-wheel is so adjusted that its peripheral surface is located in the path of the face of each tool 41 when the same is withdrawn from its work by the sliding movement of the tool-carriage, as above described. Each tool is thus sharpened after each operation upon a button-blank, thereby improving the character of the work produced. As each grinding operation removes a portion of the stock of the tool, I provide means for imparting to the tool a compensatory adjusting movement by moving the tool-holder along its dovetailed slideway on the tool-carriage. This movement is at an angle of forty-five degrees and permits the adjusted tool not only to be properly presented to the emery-wheel for resharpening, but the resharpened tool to be presented to its work in proper position. This compensatory movement is accomplished by means of a screw-stem 95, fixed to a sliding wedge 96, engageable with the tool-holder 40, said stem fitting a similarly screw-threaded nut 97, rotatively supported in bearings on the tool-carriage and held thereby from movement longitudinally of said stem. The nut 97 is provided with a ratchet 98, engaged by the pawl 99 on the end of the lever 100, fulcrumed at 101 upon the tool-carriage and adapted to be brought by the cam-induced movement of the tool-carriage into position to be engaged by a fixed arm 102, whereby said pawl is caused to operate said ratchet and through the intervening mechanism impart to the tool-holder and wheel a step-by-step movement of adjustment. The adjustable stop 103 on each tool-carriage serves to limit the movement imparted thereto by means of the weight 47, and thus to limit the depth of penetration of the tool into the work.

What I claim as new, and desire to secure by Letters Patent, is—

1. In a machine of the class described and in combination work-feeding mechanism; a chuck; a tool; means for moving said tool and chuck in unison toward and from said feeding mechanism; and means for moving said tool at certain times toward and from said chuck.

2. In a machine of the class described and in combination work-feeding mechanism; a plurality of chucks movable toward and from the same; means for presenting said chucks successively to the feeding mechanism; and a plurality of tools each coöperative with one of said chucks and movable in unison therewith toward and from said feeding mechanism.

3. In a machine of the class described and in combination a movable support; and means for moving the same; work-feeding mechanism mounted upon a stationary support; a chuck and a tool coöperative therewith, both mounted upon said movable support and movable therewith toward and from said feeding mechanism; and means for producing a relative movement between said tool and chuck at certain times.

4. In a machine of the class described and in combination work-feeding mechanism having a movable work-carrier; a chuck and means for moving said chuck toward and from said feeding mechanism; means for moving said carrier in unison with said chuck at certain times; and means for transferring the work from said carrier to said chuck while moving in unison with each other.

5. In a machine of the class described, and in combination, a frame or support; a table rotatively mounted thereon; a plurality of chucks mounted upon said table and movable therewith; a plurality of tools mounted upon said table, movable therewith, and coöperative with said chucks respectively; means for rotating said table; and means for operating said chucks and tools while the table is rotating.

6. In a machine of the class described, and in combination, a frame or support; a table rotatively mounted thereon; a plurality of chucks mounted upon said table movable therewith; a plurality of tools mounted upon said table, movable therewith, and coöperative with said chucks respectively; means for rotating said table; and means for causing a relative movement between the several chucks and the respective coöperating tools at certain times while the table is rotating.

7. In a machine of the class described, and in combination, a frame or support; a table rotatively mounted thereon; means for rotating said table, a plurality of rotatory chucks; chuck-rotating spindles rotatively mounted in bearings upon, and arranged radially of, said table; a drive-shaft rotatively mounted in bearings on said support concentric with said table; operating connections between said shaft and the several chuck-spindles; and tools carried by said table coöperative with the respective chucks.

8. In a machine of the class described, and in combination, a frame or support; a table rotatively mounted thereon; means for rotating said table; a plurality of rotatory chucks; chuck-rotating spindles rotatively mounted in bearings upon, and arranged radially of, said table, a drive-shaft rotatively mounted in bearings on said support concentric with said table; a bevel-gear on said shaft; and beveled pinions on the inner ends of the respective chuck-spindles engageable with said bevel-gear.

9. In a machine of the class described, and in combination, a movable table; means for moving the same; a chuck carried by said table; a tool; a tool-carriage slidable along a way on said table toward and from said chuck;

and cam mechanism whereby the movement of the table induces sliding movements of said tool-carrier at certain times.

10. In a machine of the class described, and in combination, a movable table; means for moving the same; a chuck carried by said table; a tool; a tool-carriage mounted upon said table and movable toward and from said chuck; a cam-follower connected with said carriage; a relatively fixed cam in the path of said follower adapted to withdraw the carriage and tool from the chuck; and mechanism wholly carried by said table for moving said carriage and tool toward the chuck.

11. In a machine of the class described, and in combination, a chuck; a tool-grinding mechanism; a tool-carriage movable back and forth between said chuck and grinding mechanism; a tool movably supported in an oblique slideway on said carriage; an adjusting-wedge for moving said tool along its oblique slideway; and means for operating said wedge from time to time to cause a compensatory readjusting movement of the tool after the grinding operation, substantially as described.

12. In a machine of the class described, and in combination, tool-grinding mechanism mounted upon a stationary support; a table rotatively mounted upon said support; a chuck carried by said table; a tool-carriage movably mounted on said table; a tool adjustably mounted on said carriage; means for moving said carriage toward and from said chuck, and to and from a position to cause the tool to be engaged by said grinding mechanism when carried past the same by the movement of the table; means for adjustably moving the tool on the carriage comprising a wedge; a screw for actuating said wedge; and pawl-and-ratchet mechanism for operating said screw, all carried by said table; and pawl-operating mechanism mounted on said stationary support, substantially as described.

13. In a machine of the class described, and in combination, a feed-table provided with an aperture; a work-carrier movable toward and from said aperture and adapted to receive work therethrough; a chuck; means for imparting to said chuck a movement of translation; means for moving said work-carrier at certain times in unison with said chuck; means for transferring the work from said carrier to said chuck while moving in unison with each other; and means for inducing a return movement of the work-carrier.

14. In a machine of the class described, and in combination, a feed-table provided with an aperture; a work-carrier movable toward and from said aperture and adapted to receive work therethrough; means for automatically supplying the work to said aperture; a chuck; means for imparting to said chuck a movement of translation; means for moving said work-carrier at certain times in unison with said chuck; means for transferring the work from said carrier to said chuck while moving in unison with each other; and means for inducing a return movement of the work-carrier.

15. In a machine of the class described, and in combination, a chuck; means for imparting thereto a movement of translation; means for opening and closing the chuck at certain times; a work-carrier; means for moving the work-carrier in unison and juxtaposition with the opened chuck; a work-projecting plunger mounted on the carrier; and means for operating said plunger to project the work from the carrier to the open chuck while said chuck and carrier are moving in unison.

16. In a machine of the class described, and in combination, a chuck; means for imparting thereto a movement of translation; means for opening and closing the chuck; work-feeding mechanism having a work-projecting plunger; means for moving the work-feeding mechanism in unison with the chuck at certain times; and mechanism whereby the translational motion of the chuck induces action of said plunger to project the work from the feeding mechanism into the opened chuck.

17. In a machine of the class described and in combination, work-feeding mechanism; a chuck; a tool; a common support for said chuck and tool; means for producing a relative movement between said tool and chuck longitudinally of the axis of the chuck; and means for producing a relative movement transversely of the axis of the chuck between said feeding mechanism and said chuck and tool support, whereby movements of approach and recession are alternately produced between said tool and chuck and said feeding mechanism.

18. In a machine of the class described and in combination, a chuck; work-feeding mechanism having a movable work-carrier; means for producing a relative movement between said carrier and chuck at certain times transversely of the axis of the chuck; means for maintaining said carrier and chuck relatively stationary at certain times; and means for transferring work from the carrier to the chuck while maintained relatively stationary.

19. In a machine of the class described and in combination, a chuck; means for moving said chuck through an endless path; means for automatically feeding work to said chuck while so moving; a tool movable along an endless path in unison with said chuck; said chuck and tool being capable of relative movements one toward and from the other; and means for producing relative movements between said chuck and tool one toward and from the other while both are traversing their respective endless paths.

20. In a machine of the class described and in combination, a chuck; means for moving the chuck along a path; work-feeding mechanism adjacent to the path of the chuck; and means for automatically moving said feeding mechanism in unison with said chuck while work is being transferred from the feeding mechanism to the chuck.

In testimony whereof I have hereunto set my hand this 27th day of January, 1905.

HARVEY CHALMERS.

Witnesses:
J. H. HANSON,
ELLEN M. CROWE.